Figure 1:
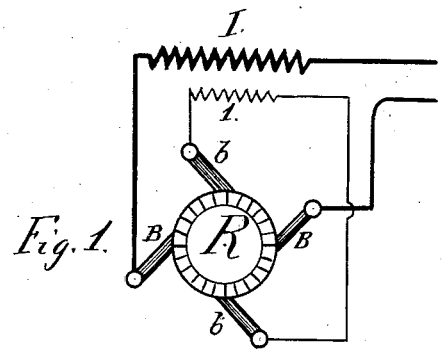

No. 865,701. PATENTED SEPT. 10, 1907.
A. HEYLAND.
ALTERNATE CURRENT GENERATOR AND MOTOR.
APPLICATION FILED JUNE 9, 1902.

3 SHEETS—SHEET 1.

No. 865,701. PATENTED SEPT. 10, 1907.
A. HEYLAND.
ALTERNATE CURRENT GENERATOR AND MOTOR.
APPLICATION FILED JUNE 9, 1902.

3 SHEETS—SHEET 3.

UNITED STATES PATENT OFFICE.

ALEXANDER HEYLAND, OF BRUSSELS, BELGIUM.

ALTERNATE-CURRENT GENERATOR AND MOTOR.

No. 865,701.  Specification of Letters Patent.  Patented Sept. 10, 1907.

Application filed June 9, 1902. Serial No. 110,908.

*To all whom it may concern:*

Be it known that I, ALEXANDER HEYLAND, a subject of the German Emperor, and a resident and having my post-office address at Brussels, 32 Rue du Marteau, Belgium, have invented certain new and useful Improvements in Alternate-Current Generators and Motors, of which the following is a specification.

The object of my invention is to provide a new efficient method of compounding, under as well as over compounding, alternating current generators or motors and relates to those of similar construction as described by Gorges, Patent 510,534, Dec. 12, 1893, Wilson, Patent 688,805, December 10, 1901, and in my specification, Serial No. 93,763, and others.

Alternating current synchronous or asynchronous motors or generators for single or polyphase currents can be made self exciting by means of a commutator and brushes to which alternating current is supplied. This commutator device connected directly or indirectly with the rotor winding transforms the alternating current and makes it suitable for the excitation of the machines.

Asynchronous induction machines which are made self-exciting by means of a commutator and brushes have the characteristic feature of having no armature reaction for watt currents. Such machines have a rotor without pole-pieces and a winding connected with a commutator having a number of segments which is a multiple of the number of poles. The field produced in these machines is not fixed with regard to the poles but can move as in the rotor of an induction motor, *i. e.* the machines are asynchronous.

In machines of this character it is well known that the field developed by the induced currents in rotor revolves asynchronously with relation with that developed by the currents in the stator.

As pointed out in my specification, Serial No. 93,763, Filed Feby. 12, 1902, in the machines of the type referred to, the induction currents in the rotor are equal but oppositely directed to the working currents in the stator if the machine is loaded with a non-inductive load, or to the watt components of the working currents if the load is inductive. These induction currents therefore annihilate the demagnetizing influence of the stator ampere turns and the result is, that the machine is compound if loaded with a non-inductive load, without any special arrangement. These induction currents however are not oppositely directed to the wattless currents in the stator and cannot annihilate these currents. The wattless component of the working current will therefore still have its full demagnetizing influence and cause a drop of pressure. This counteraction will be clearly understood on reference to Figure 7 hereinafter referred to. To annihilate this demagnetizing influence I supply the same rotor winding not only with the exciting current but also with the principal current by means of the same commutator and a second set of brushes, or the same set of brushes but connected in two different ways as explained hereafter.

Figure 2:
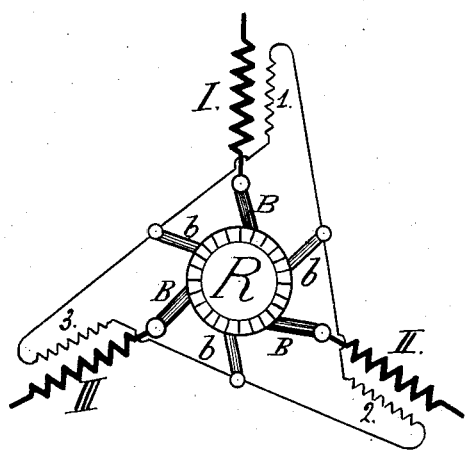
Figure 3:
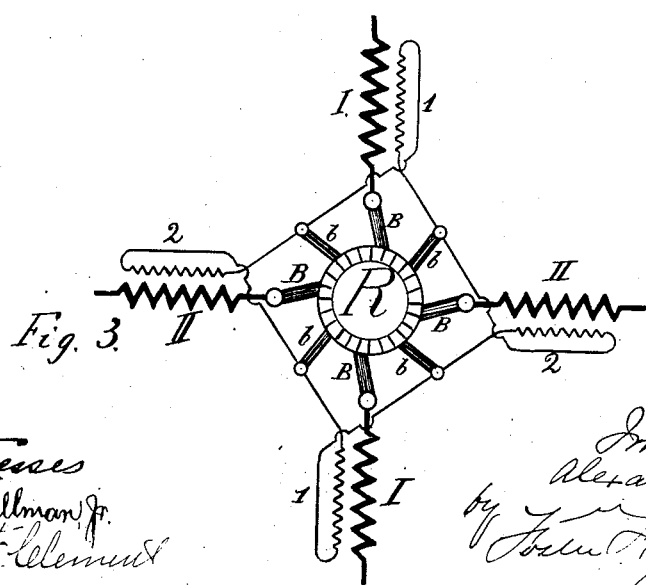
Figure 4:
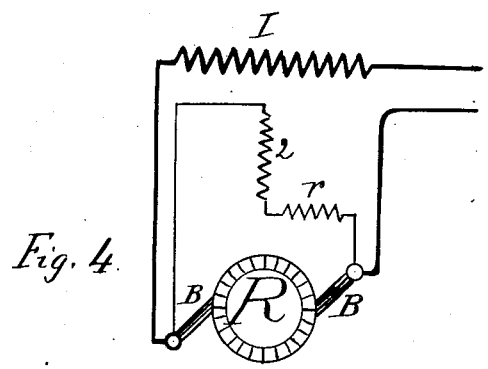
Figure 5:
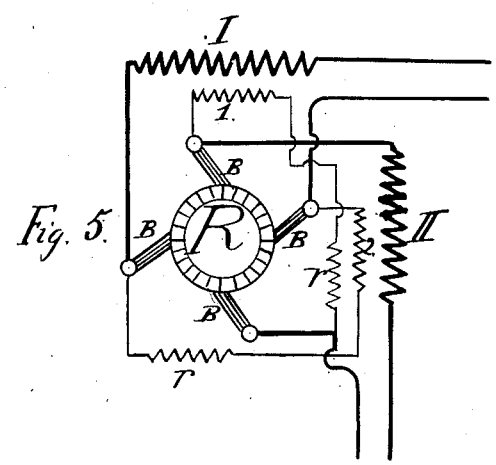

In the accompanying drawings Figs. 1, 2, 3, 4, 5, 6 and 7 represent an asynchronous motor or generator of this type; Figs. 1 and 4 for a single phase excitation and compounding; Figs. 3 and 5 for two-phase; and Figs. 2 and 6 for three-phase excitation and compounding.

In diagram Fig. 1 the main stator windings in which the alternating current is generated are represented by I, the auxiliary winding which supplies the excitation by 1. The excitation can also be supplied by a part of the main winding or by a transformer connected to the stator terminals as described in my specification, Serial No. 93,763. R is the rotor with its winding and commutator to which the exciting current is supplied by the brushes $bb$. The main current is supplied to the rotor by the brushes BB in series with the main winding. These brushes BB make with the brushes $bb$ an angle of 90°.

In Fig. 2 the three phases are indicated by I, II and III, the auxiliary winding by 1, 2 and 3 and the brushes by $bbb$ and BBB.

In Fig. 3 the phases are indicated by I and II, the auxiliary winding by 1 and 2 and the brushes by $bbbb$ and BBBB.

The second set of brushes for compounding, indicated by B, is situated at about half the distance between the brushes $b$ which supply the exciting current as is shown by the schematical drawing (Figs. 1, 2, 3). It will thus be seen that this mode of compounding requires twice the number of brushes required by a non-compounded generator.

Figure 6:
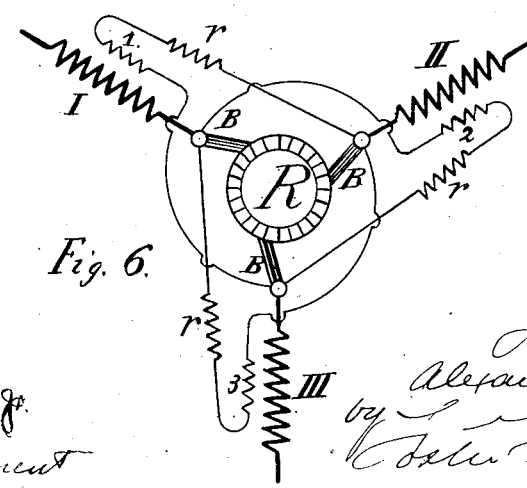

The following is a compounding arrangement which is based on the same principle, but does not involve the use of an increased number of brushes. Let it be presumed that according to Fig. 4 the auxiliary winding 2, which supplies the exciting current is so arranged that its electro-motive force is displaced ninety degrees relatively to the electro-motive force in the main winding I. It is thus obvious that the supply of current to the armature must also have a displacement of ninety degrees, that is to say, the additional brushes will occupy the same position as the brushes which supply the main current so that the same brushes will serve both for the main current and the exciting current (Fig. 4), and it will not be necessary to increase the number of brushes. This latter arrangement is thus characterized by the feature that the same brushes are connected to a main winding and to an auxiliary winding which windings are of different phase relatively to each other. This arrangement may be applied to polyphase current machines as represented by Figs. 5 and 6. A two-phase machine (Fig. 5) would require four brushes B, while a three-phase machine (Fig. 6) would require three brushes, that is to say, these machines, when compounded according to my last named arrangement, would require the same number of brushes as the corresponding non-compounded machines. Besides reducing the number of brushes, the arrangements last described also reduce the brush current, for when the brushes are in separate sets, they must carry the full exciting current and the full main current respectively, while when combined they only carry the geometrical sum of both currents which on account of the relative displacements of the currents' phases is much less than the arithmetical sum of the same currents. These arrangements are of course further susceptible of a large number of modifications. The brush currents need not necessarily be taken directly from the windings, but may be obtained in any suitable manner. In the arrangement with the combined brushes it will be useful to insert an ohmic resistances $r$ in the excitation circuit to avoid a short-circuiting between the main and auxiliary winding.

Figure 7:
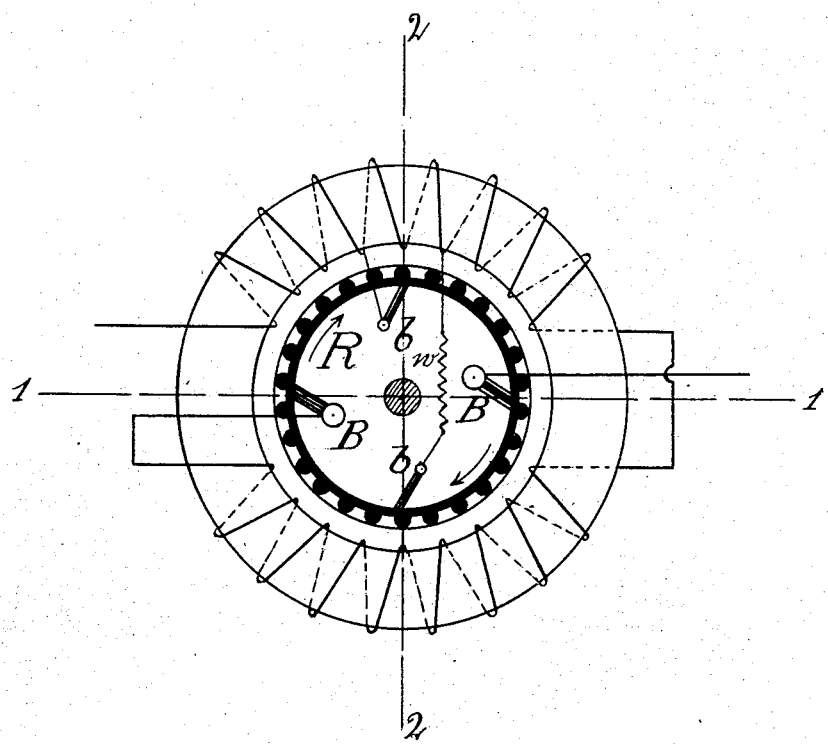

Referring to Fig. 7 the line of commutation of the brushes BB for the introduction of compounding current is represented by the line 1—1 and this line also represents the polar line of the stator winding. The polar line of the compounding current and of the stator windings are therefore identical. The line of commutation of the exciting current at constant potential is represented by the line 2—2 at right angle to the line 1—1.

My invention is applicable to multipolar machines in the same manner as explained hereinbefore for the sake of simplicity with regard to bi-polar machines. In the same way it will be possible to interchange the rotating and the stationary parts and all arrangements in use for the adjusting and regulating of compound machinery can be employed, for instance ohmic resistances in parallel with the brushes.

Without limiting myself to the construction and arrangement shown, I claim:

1. In an alternating current dynamo electric machine, the combination with relatively movable windings, of a commutator connected to one of said windings, brushes bearing upon said commutator, a circuit having a sensibly constant potential impressed upon it connected to certain of said brushes, and a circuit carrying current proportional to the current in the other of said windings also connected to certain of said brushes, substantially as described.

2. In a single or polyphase alternating current motor or generator, the combination with brushes and a commutator, of a winding connected to said commutator, a stator winding, and circuits connected to said brushes, one of said circuits having a potential proportional to that of said stator winding impressed upon it for the purpose of exciting the machine with a sensibly constant current, and another of said circuits being connected in series with the stator winding for the purpose of supplying to the rotor a component increasing or decreasing with the main current to annihilate the armature reaction of the working current, substantially as described.

3. In a single or polyphase alternating current motor or generator, the combination with a commutator, of a stator winding, a circuit having a potential proportional to that of the stator winding impressed upon it, for the purpose of exciting the machine with a sensibly constant current, and another circuit connected in series with said stator winding, for the purpose of supplying to the rotor a component increasing or decreasing with the main current to annihilate the armature reaction of the working current, and a set of brushes common to said circuits, substantially as described.

In testimony whereof I have signed my name to this specification in the presence of two subscribing witnesses.

ALEXANDER HEYLAND.

Witnesses:
VONDER HEGDT,
GREGORY PHELAN.